United States Patent [19]

Chu

[11] 4,073,856
[45] Feb. 14, 1978

[54] METHOD OF FABRICATING WELDED PFA-TO-PTFE STRUCTURES

[75] Inventor: Edward J. Chu, Parsippany, N.J.

[73] Assignee: Resistoflex Corporation, Roseland, N.J.

[21] Appl. No.: 649,831

[22] Filed: Jan. 16, 1976

Related U.S. Application Data

[63] Continuation of Ser. No. 484,852, July 1, 1974, abandoned.

[51] Int. Cl.² .............................................. B29B 3/00
[52] U.S. Cl. .................................. 264/259; 264/267; 264/275
[58] Field of Search ................. 264/127, 259, 275, 267

[56] References Cited

U.S. PATENT DOCUMENTS

| | | | |
|---|---|---|---|
| 3,206,344 | 9/1965 | Elkins, Jr. | 264/259 |
| 3,946,136 | 3/1976 | Fitz et al. | 428/422 |

*Primary Examiner*—Robert F. White
*Assistant Examiner*—James R. Hall
*Attorney, Agent, or Firm*—Watson, Leavenworth, Kelton & Taggart

[57] ABSTRACT

A method is described whereby perfluoroalkoxy (PFA) fluorocarbon resin is fusion bonded to polytetrafluoroethylene (PTFE) resin to provide united sections thereof and to provide a bonded or welded interconnection between separate sections of PTFE resin. The welds are obtained under minimal positive pressure, generally below about 40 psi, at a temperature above the gel point of the PTFE resin, generally between 635° F. and 710° F., with subsequent slow cooling under pressures somewhat higher and generally ranging between about 59 psi and 150 psi.

16 Claims, 9 Drawing Figures

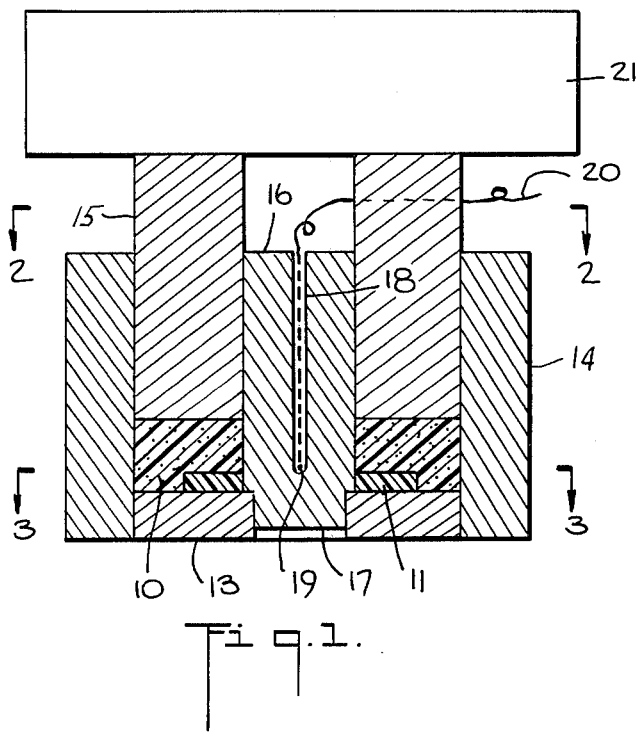
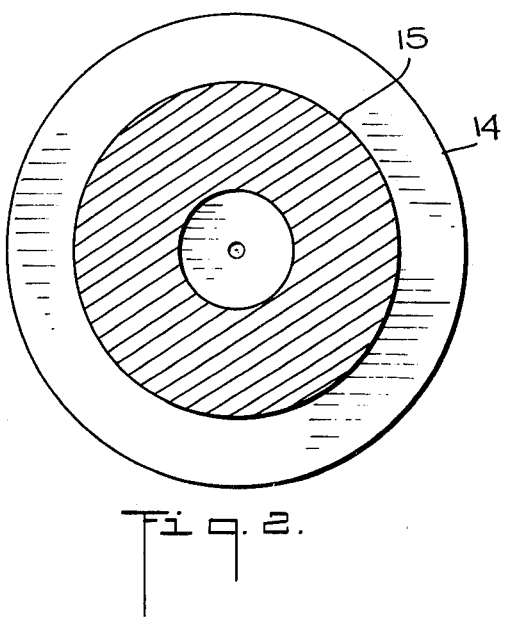
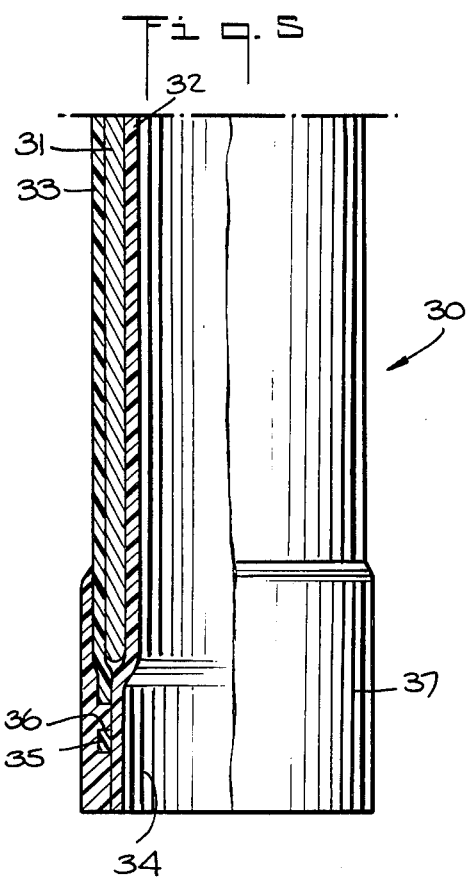
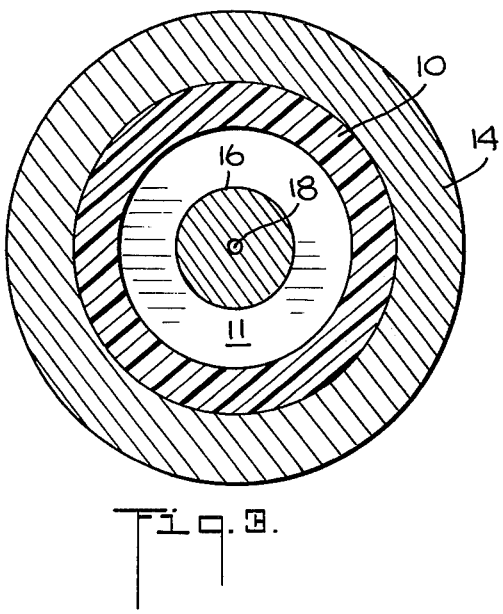
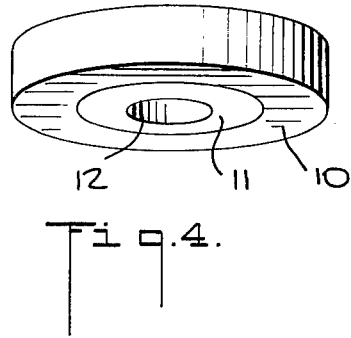

METHOD OF FABRICATING WELDED PFA-TO-PTFE STRUCTURES

This is a continuation of application Ser. No. 484,852, filed July 1, 1974, now abandoned.

The present invention relates to fluorocarbon resins, and methods for fabricating same. More specifically it relates to the perfluoroalkoxy fluorocarbon resins (hereinafter abbreviated PFA) and their use in combination with the tetrafluoroethylene resins (hereinafter abbreviated PTFE).

It is well known that PTFE has certain outstanding chemical and electrical characteristics which could be utilized to better advantage if various problems in fabrication could be overcome. Because of its extremely high viscosity above its melting point of 327° C. (621° F.), more generally referred to as a gel point, the polymer cannot be processed by conventional thermoplastic techniques. One major drawback has been the difficulty in welding or fusing sintered PTFE to itself.

Recently, there has been made available "Teflon" PFA (perfluoroalkoxy) fluorocarbon resin which approaches PTFE in chemical and electrical characteristics but differs therefrom in being melt-extrudable above its melting point which is nominally specified as lying between 302° C. and 310° C. (576° F. and 590° F.) by E. I. Du Pont de Nemours & Company (Inc.) of Wilmington, Del., its producer. At present, PFA resin is more costly than PTFE resin, a factor which diminishes its usefulness.

The present invention seeks to obtain simultaneously the benefit of the lower cost of PTFE resin and the more versatile handling characteristics of PFA resin. It is predicated upon the discovery that PFA resin can be welded or fused to sintered PTFE resin such that the weld is at least as strong as the weaker resin. While this discovery will have wide ranging possibilities limited only by the imagination of the user, only one example should be sufficient to present the reader with the principles of practicing the method for making such weld and to provide the necessary guidelines for adapting the method to the fabrication of other articles.

In U.S. Pat. No. 3,085,438, issued Apr. 16, 1963, on an application of A.N.T. St. John and William E. Titterton, assigned to the same assignee as the present application, there is disclosed a dip pipe assembly having a metal core which is lined and jacketed with sintered PTFE resin. Several methods are disclosed in said patent for establishing a fluid-tight seal between the liner and jacket at the free end of the core, i.e., the end which projects into the vessel or the like. Certain embodiments described therein rely upon the use of a special swaged or crimped ring or cup-like member to establish the seal while others rely upon an interposed strip of unfused PTFE tape which serves to bond the jacket to the liner when heated to about 720° F. Unfortunately, experience has revealed that said seals are liable to fail in use, particularly in the face of the severe vibration to which a dip pipe is generally subjected. This problem is eliminated by the present invention.

In its broadest sense, the present invention provides a method for producing a resin structure characterized by a section of PFA resin fused to a section of PTFE resin. For example, utilizing the subject method there is provided a dip pipe comprising a reinforcing tubular core having one end encased between a liner and a jacket of sintered PTFE resin whose ends, terminating adjacent said one end of said core, are united to establish a fluid-tight seal therebetween by an interconnecting body of PFA resin joined to said PTFE resin by fusion bonding.

In accordance with the subject invention, there is provided a method of forming a fluorocarbon resin structure in which a body of PFA resin is fused to a body of sintered PTFE resin. The method comprises the steps of confining a quantity of particulate PFA resin in a zone contiguous to said body of sintered PTFE resin, heating said quantity of PFA resin and at least the PTFE resin which is adjacent said zone to a temperature above the gel point of said PTFE resin and above the melting point of said PFA resin to melt said PFA resin. Said elevated temperature is maintained while compacting said PFA resin against said PTFE resin under positive pressure just sufficient to urge said PFA resin melt at a very slow rate without fault producing flow therein into intimate surface contact with said PTFE resin until said former wets the surface of said latter over an area to be fused. After establishing said intimate contact, the conditions at the fusing interface are maintained static by increasing the pressure applied to said PFA resin to a predetermined level at a rate which is sufficiently slow so that there is a minimum tendency for said PFA resin to flow along the surface of said mating PTFE resin, and said resins are permitted to cool slowly without force cooling toward ambient temperature while maintaining said pressure near said predetermined level where said predetermined level is chosen sufficient to prevent the formation of sinks and voids in said PFA resin while cooling but below the level at which noticeable flow is induced in said PFA resin, and continuing said slow cooling at least until said PFA has solidified, thereafter completing said cooling and removing said pressure whereby said PFA resin becomes fused to said body of PTFE resin at the interface therebetween.

The invention will be better understood after reading the following detailed description of the presently preferred embodiments thereof with reference to the appended drawings in which:

FIG. 1 is a vertical sectional view through a mold of elementary configuration useful in explaining the basic principles of the invention under ideal conditions;

FIG. 2 is a transverse sectional view taken along line 2—2 in FIG. 1;

FIG. 3 is a transverse sectional view taken along line 3—3 in FIG. 1;

FIG. 4 is a perspective view of a fluorocarbon resin structure as produced in the mold of FIG. 1 and composed of PFA resin fused to PTFE resin;

FIG. 5 is a fragmentary view partly in vertical section showing the free end of a dip pipe constructed with the method of the present invention;

Figure 6:
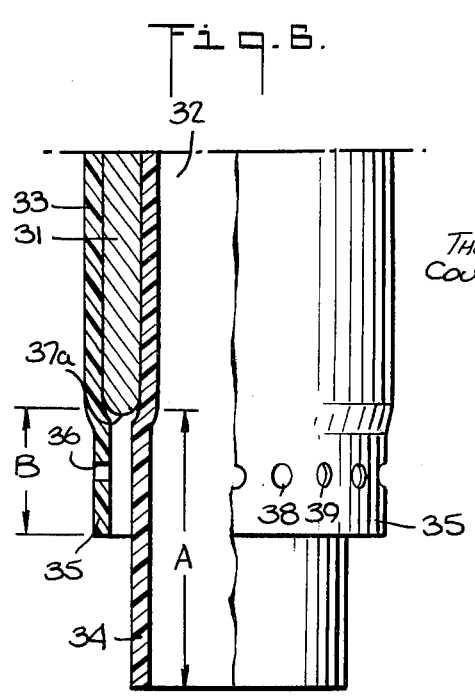
FIG. 6 is a view similar to FIG. 5, showing the dip pipe at an early stage in its fabrication with only the liner and jacket in place on the core.

Throughout the drawings, the same reference numerals are used to designate the same or similar parts. Now referring to FIGS. 1 to 4, there is illustrated a mold assembly for producing an annulus having a principal body section 10 of PFA fused to an inset section 11 of sintered PTFE. The completed annulus, as best seen in FIG. 4, includes a through central aperture 12. The mold assembly includes a bottom plug 13 fitting snugly within a cylindrical shell 14 receiving a hollow cylindrical ram 15 which mates telescopingly with a central core pin 16 having a reduced diameter end 17 inserted in a central aperture in the bottom plug 13. The center of the plug 16 is provided with a thermocouple well 18 holding a thermocouple 19 whose electrical connecting lead 20 may be attached to a suitable indicating or recording instrument, not shown. A deadweight 21 is shown resting upon the ram 15 for loading the same to apply pressure to the resin charge placed within the cavity formed between the bottom of said ram 15 and the bottom plate or plug 13.

By way of example, a typical procedure for using the subject mold involved placing the ring or annulus 11 of sintered PTFE in the mold over the core pin 16 to rest on the bottom plug 13, as shown. Thereupon, a PFA charge, in pellet form, was poured into the shell 14 around the core pin 16 and leveled. Then the ram 15 was placed over the charge much as shown in FIG. 1. Deadweight 21 weighing 26 pounds was then placed on top of the ram 15 and the entire assembly was placed in an oven for heating the same. The assembly was left in the oven until the temperature as indicated by the thermocouple 19 stabilized at about 640° F. The temperature was held at this level for 120 minutes. During this entire interval the PFA charge was subjected to a theoretical force of 5 psi as calculated from the dimensions of the mold and the combined weight of the deadweight 21 and ram 15.

At the end of the foregoing period of 120 minutes, the assembly was removed from the oven, the weight 21 removed and the mold was then placed between the platens of a small press. A relatively low elevated pressure, calculated at about 140 psi was gradually applied to the mold over a period of about 25 seconds. When said elevated pressure was attained, it was maintained while the mold was allowed to cool under ambient conditions down toward room temperature. Artificial or forced cooling was avoided. Both slow cooling and relatively low pressures are believed to be critical to the satisfactory practice of the subject process. When room temperature was reached, the resin annulus was removed from the mold yielding the structure shown in FIG. 4 which upon sectioning and testing demonstrated the existence of excellent fusion welds along all of the contacting surfaces of the two resins which welds resisted fracture at the weld point when subjected to tensile and shear stresses. Failures occurred in one or the other of the main resin bodies rather than at the weld.

The conditions involved in the production of the annulus, as described above, were ideal because of the simple geometry. As will appear from the ensuing description, it is important that the geometry of the mold and the temperature and pressure parameters be controlled so that there is a minimum tendency for the PFA resin to flow relative to the surface of the mating PTFE resin to which a weld is to be established.

From the foregoing it should be apparent that pressure is applied to the resin charge during two distinct phases of the molding procedure. During the first phase the charge is being heated to above its melting point and held at such elevated temperature for a period sufficient to ensure development of the weld. While published literature of the resin manufacturer recommends pressures of the order of 1000 to 4000 psi at 700° F. with 1000 to 2000 psi being preferred for transfer molding with PFA resin, it has been found that significantly lower pressures must be used when attempting to weld PFA resin to PTFE resin. As a general rule, the pressure employed during the above mentioned first phase should be just sufficient to urge the PFA resin melt at a very slow flow rate into intimate surface contact with the PTFE until the former wets the surface of the latter. Once contact or wetting is achieved, the conditions should be maintained static at the welding interface. The second phase involves slow cooling of the PFA resin until it solidifies and this must be accomplished under sufficient pressure to avoid the formation of voids and sinks within the PFA resin section. However, it is equally important that the pressure during phase two not exceed that at which significant flow is caused within the PFA resin material. The examples which are set forth herein are guidelines only. For each new molding geometry, based on the principles taught herein, the necessary temperature and pressure parameters will have to be ascertained empirically.

For purposes of comparison, a test was run with the mold described with reference to FIG. 1 wherein the first phase of the procedure was substantially the same as that already described. That is, the mold was heated to a stabilization temperature of about 640° F. and held at such temperature for 120 minutes with the resin charge subjected to a pressure of approximately 5 psi. However, during phase two (the cooling phase) the deadweight 21 was eliminated such that the charge was subjected only to the pressure of the ram 15, which pressure was calculated as being approximately 0.3 psi. The resultant annulus was found to have good welds between the PFA and PTFE resins but sinks and voids were found in the PFA resin section.

Referring to FIG. 5, there is illustrated the free end of a dip pipe 30 constructed in accordance with the present invention. Only the free end which normally projects into the vessel or container in which the dip pipe is installed is shown in FIG. 5. For further details the reader is directed to the disclosure in the above mentioned St. John et al. patent.

As seen in FIG. 5, the dip pipe includes a cylindrical reinforcing tube or core 31 generally formed of metal such as steel or the like. A liner 32 and a jacket 33 encase the core 31 with the end 34 of the liner extending for a distance beyond the lower end of the core 31 and with the end 35 of the jacket extending for a somewhat lesser distance beyond the end of said core 31. Both the liner 32 and the jacket 33 are formed from sintered extruded PTFE resin. As clearly shown in FIG. 5, the liner 32 has its diameter expanded slightly in the region 34 abutting in intimate contact the jacket end 35. The end 35 of the jacket is provided with a plurality of apertures circumferentially spaced therearound with one of the apertures being shown at 36. An annular body 37 of PFA resin surrounds the projecting portions or ends 34 and 35 of the liner and jacket, respectively, as well as a portion of the core 31 immediately adjacent the end thereof. The PFA resin material projects through the aperture 36 and, as will be apparent from the ensuing description, projects through all of the other apertures disposed around the end of the jacket to engage and bond to the projecting end 34 of the liner. All of the area of contact between the PFA resin body 37 and the surfaces of the liner 32 and jacket 33 are characterized by a fusion bond or weld such as that described previously herein. Under certain circumstances a partial weld or weak weld may exist along the interface between the end 35 of the jacket and the end 34 of the liner where they are in contact. However, such weld between sections of PTFE resin is characterized by being significantly weaker than the resin body such that any stresses applied thereacross will cause separation of the weld before fracture or failure of the PTFE resin material. This is not true of the welds formed between the PFA resin and the PTFE resin.

The presently preferred procedure for producing the dip pipe 30 will now be explained. Reference should be had to FIG. 6. As described more fully in U.S. Pat. No. 3,050,786, issued Aug. 28, 1962, to the assignee of the subject application, a tube of sintered extruded PTFE resin can be prestressed such that, upon heating, the tube will tend to return to its original size. Such prestressing can be such as will cause an increase or a decrease in the girth thereof, as the case may be. By proper choice of the original size relative to the tubular core, it is possible to cause a jacket to shrink down upon, and a liner to expand within, the core and provide a strongly united assembly. It is also possible by proper choice of the stress relaxing temperature to cause the liner to draw away from the wall of the core developing a slip fit relative thereto. In the present instance, this is accomplished by relaxing the liner at about 525° ± 25° F. What is desired is a clearance of a few thousandths of an inch.

The preliminary structure shown in FIG. 6 is prepared by providing the core 31, preferably of steel, with a "shrink fit" jacket 33. The inside of the core 31 is then furnished with a liner 32 by the foregoing heat expansion technique such that it makes a slip fit therewith. At this stage, the liner should project beyond the end 37a of the core 31 a greater distance than required. The liner is then slipped out of the core 31 and cut to the desired length such that it overhangs the end 37a of the core 31 by the desired amount "A" as shown on FIG. 6. Values for this and other significant dimensions will be found below. While the liner 32 is removed from the core 31, the jacket 33 is trimmed such that the projecting end 35 has the desired dimension "B." At the same time the aperture 36 as well as the other identical apertures 38 and 39, for example, are punched with a suitable hole punch circumferentially around the lower end 35 of the jacket equally spaced thereabout. Satisfactory results have been obtained with apertures having a diameter of 3/16ths of an inch, although the size of such apertures does not appear to be critical. The liner 32 is then reinserted into the core 31 to produce the sub-assembly shown in FIG. 6.

Figure 7:
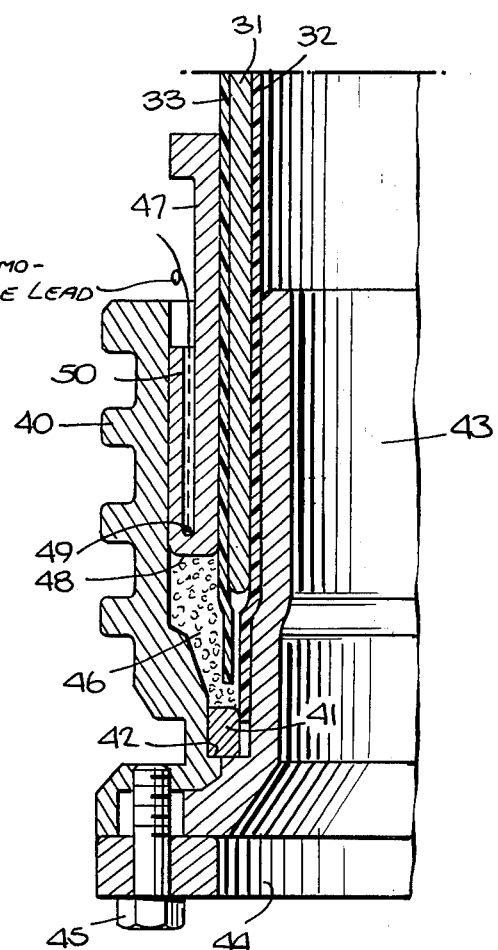
FIG. 7 is a fragmentary vertical sectional view showing the structure of FIG. 6 in a mold for fusing PFA thereto.

Referring now to FIG. 7, a cylindrical mold chamber 40, supporting a restraining ring 41 on a shoulder 42, is slipped over the sub-assembly of FIG. 6. The ring 41 is urged over the extending end 34 of the liner with which it makes a slip fit. Next, the mold core 43 is inserted within the liner 32. If the fit between the mold core 43 and the enlarged end 34 of the liner is a slip fit, there should be no difficulty in inserting the core 43 into the liner 32 to the position shown in FIG. 7. However, if sufficient interference is encountered between the core 43 and the enlarged or belled end of the liner, the latter may be heated with a hot air gun to soften it sufficiently such that it will expand enabling insertion of the core 43. Thereafter, clamp ring 44 is secured to the chamber 40 by a plurality of bolts such as that shown at 45 to effect a liquid tight seal. Suitable fluid seals may be used as required.

The clearance between the inner diameter of the ring 41 and the outer diameter of the core 43 which faces the ring 41 should be such as to just accommodate the normal wall thickness of the liner 32. The ring 41 serves to anchor the end of liner 32 against the core 43 preventing separation therebetween during the subsequent molding cycle.

When the sub-assembly consisting of the liner 32, core 31 and jacket 33 is installed in the mold, as shown in FIG. 7, the charge of PFA resin in the form of pellets or chips is poured into the cavity 46. A slight gap will be present between the liner and jacket at the ends thereof, but the PFA resin particles are sufficiently large that they do not enter said gap. Next, a cylindrical ram 47, split longitudinally, is placed around the jacket 33 and inserted between the surface of said jacket and the inner wall of the mold chamber 40. It is slipped down on top of the PFA charge. The size of the charge 46 should be selected such that the lower end 48 of the ram will not travel below the level of the end 37a of the core 31 during the molding and cooling operation. Generally speaking, it has been found that the PFA resin in pellet form has a bulk factor such that its final volume after molding is about one-third its original loose volume prior to molding. The bulk factor of chips or reclaimed PFA resin appears to be somewhat greater than that of the pellet form and requires somewhat more original volume. The quantity of PFA resin to be employed in any molding procedure can be established readily by experiment.

Figure 8:
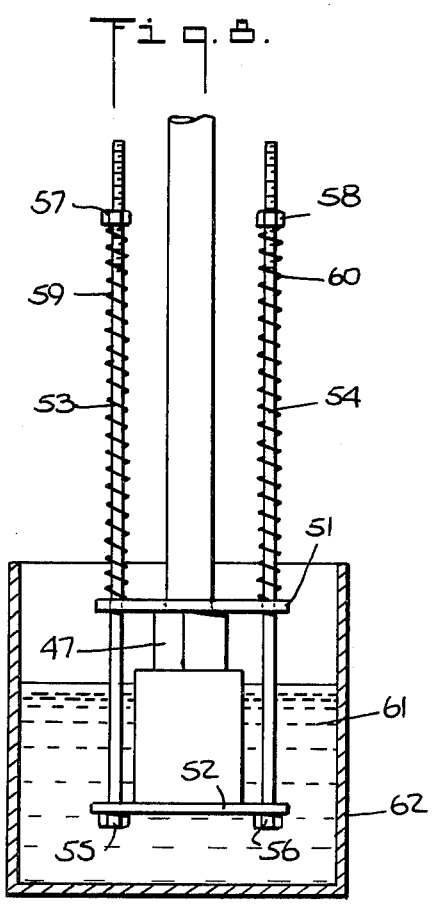
FIG. 8 is a diagrammatic view showing the assembly of FIG. 7 immersed in a hot salt bath and mounted between spring loaded pressure applying plates.

After the sub-assembly of FIG. 6 is installed in the mold as shown in FIG. 7, and a thermocouple 49 is installed in the thermocouple well 50 in the ram 47, the mold assembly may be placed between pressure plates 51 and 52 as shown in FIG. 8. The pressure plate 51 has a central aperture to accommodate the projecting portion of the dip pipe, as shown. Threaded rods 53 and 54 extend between the plates 52 and 51 projecting above the plate 51, as shown. Suitable nuts 55 and 56 secure the lower end of the rods 53 and 54, respectively, against the plate 52, while nuts 57 and 58, respectively, secure compression springs 59 and 60 to the projecting portions of rods 53 and 54 such that the springs bear against the plate 51. It will be understood that the pressure which plate 51 applies to the ram 47 is adjustable through manipulation of nuts 57 and 58. Knowing the parameters of the springs 59 and 60, it is possible to predetermine the force applied to the plate 51 and thereby the pressure applied via the ram 47 to the charge within the chamber 46 of the mold 40.

Nuts 57 and 58 are not tightened to apply the first phase pressure to the ram 47. It will be understood that during the molding operation the ram will travel into the mold chamber 40 causing extension of the springs 59 and 60. In known manner, this will result in a decrease in the spring force and in the pressure applied to the charge. For purpose of subsequent description, it will be sufficient to define the starting and finishing pressure during the first and second phases of the molding procedure as defined previously.

After establishing the necessary starting pressure for phase one, the entire assembly is immersed, as shown in FIG. 8, in a suitable heat transfer medium such as a bath of hot salt 61 within a suitable tank 62. Care should be taken that the salt does not overflow the lip of the mold chamber 40. The temperature is monitored by the thermocouple 49 until it stablizes at the desired molding temperature. At the termination of the first phase of the procedure, the pressure is increased on the ram by tightening the nuts 57 and 58, while the mold assembly remains in the hot salt bath 61. The nuts are tightened slowly such that the pressure for commencing phase two is reached within about 5 to 7 minutes. Thereupon the entire assembly is removed from the hot salt bath 61 and permitted to cool toward room temperature without the use of forced cooling. As soon as the PFA resin charge has solidified, this may be assumed to occur when the temperature read by the thermocouple is in the neighborhood of 320° F., the mold assembly may be immersed in a quench bath to hasten the final cooling.

Figure 9:
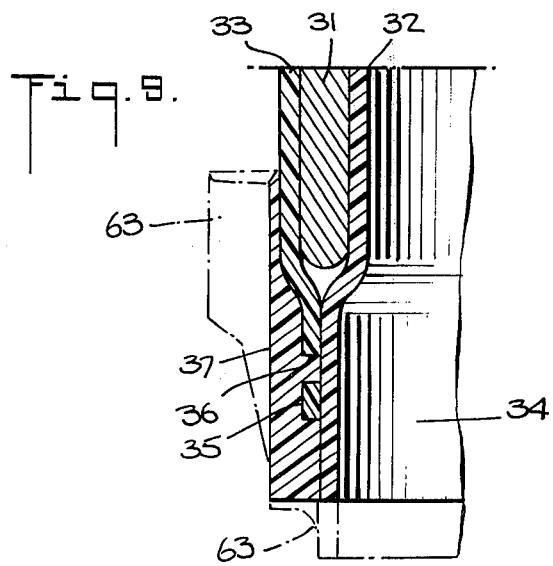
FIG. 9 is a fragmentary sectional view of the free end of the dip pipe illustrating a machining operation which is performed after molding.

When the mold has reached room temperature, it may be disassembled and the dip pipe structure removed. Such structure will have the form shown in FIG. 9 by the phantom lines 63. Then, by suitable machining, the excess PFA resin material shown within the phantom lines 63 is removed to yield the final structure as shown in solid lines in FIG. 9 and in FIG. 5.

By way of illustration, test run data obtained in the procedure of dip pipes of 1⅛ inch nominal diameter will now be set forth furnishing ranges for the various parameters which were found to give both satisfactory and unsatisfactory results. In all of the runs, the material employed to form the jacket 33 was Dupont type T62 "Teflon" TFE fluorocarbon resin modified by the addition of 0.1% carbon black. The liner in each instance was formed from type CD123 "Fluon" polytetrafluoroethylene resin supplied by ICI America, Inc. of Wilmington, Del. This latter resin is a powder for use in paste extrusion.

The PFA resin employed in the following runs is in each instance "Teflon" PFA Fluorocarbon resin type TE9705 supplied as translucent white pellets for extrusion and transfer molding by E. I. du Pont de Nemours & Co. (Inc.) of Wilmington, Del.

Data for the several runs is tabulated in the following Table I wherein dimensions "A" and "B" refer to those dimensions designated in FIG. 6. The column headed "No. Holes" indicates the number of apertures 36, etc., introduced around the circumference of the lower end of the jacket as seen in FIG. 6. All such holes are of 3/16th inch diameter and equally spaced. The significance of the numbered columns is as enumerated below the table.

The results of the runs listed in the table may be summarized as follows. Each of runs 2, 3, 4, 5 and 7 produced good welds between the PFA and PTFE resins. Only partial welds were obtained in runs 1 and 6 between the PFA and PTFE resins.

Runs 1, 2, 5, 6 and 7 produced molded PFA resin sections free from any defects.

In run 3, voids developed in the PFA section and some portions of the jacket at its end 35 remained spaced from the liner end 34 permitting PFA resin to flow upward therebetween The voids in the PFA resin indicate when compared with run 2 that the pressure applied during the cooling phase, i.e., phase two, was marginal. Run 4 also resulted in voids in the PFA resin section confirming the marginal cooling pressure. In run 6, the end of the jacket after molding extended beyond the lower end 37a of the core by approximately ⅛ inch. The weld between the PFA resin and the PTFE resin underneath this overhang is only partial. This may be due to flow of the PFA resin up the inner face of the PTFE resin behind the ⅛ inch overhang as cooling pressure was applied.

TABLE I

| RUN No. | DIMENSION "A" | "B" | NO. HOLES | 1 MIN. | 2 ° F. | 3 MIN. | 4 psi | 5 psi | 6 psi | 7 psi |
|---|---|---|---|---|---|---|---|---|---|---|
| 1 | 1⅛ | ⅛ | 0 | 45 | 660 | 120 | 37 | 26 | 74 | 63 |
| 2 | 1⅛ | ⅛ | 8 | 34 | 680 | 120 | 37 | 30 | 74 | 59 |
| 3 | 1⅛ | ⅛ | 0 | 35 | 685 | 120 | 37 | 30 | 74 | 63 |
| 4 | 1⅛ | ⅛ | 16 | 40 | 680 | 120 | 37 | 30 | 74 | 57 |
| 5 | 1⅛ | ⅛ | 16 | 31 | 685 | 120 | 37 | 26 | 148 | 133 |
| 6 | 1⅛ | 0 | 0 | 36 | 680 | 120 | 37 | 30 | 148 | 131 |
| 7 | 1⅛ | ⅛ | 16 | 34 | 680 | 60 | 37 | 22 | 148 | 133 |

Column 1 = Time to reach temperature stabilization.
Column 2 = Stabilization temperature as indiated by thermocouple.
Column 3 = Time at stabilization temperature.
Column 4 = Pressure at start of phase 1.
Column 5 = Pressure at end of time in Col. 3, end of phase 1.
Column 6 = Pressure at start of phase 2, cooling starts.
Column 7 = Pressure at end of phase 2, cooling completed.

Experience has demonstrated that with proper control the gap disappears from between the end 35 of the jacket 33 and the end 34 of the liner 32. Apparently, the ends of the jacket and liner are urged into contact before the PFA resin becomes flowable such that PFA resin does not penetrate between the two PTFE layers. Of course, the foregoing is true only when the "B" dimension of the jacket is sufficient to permit its deflection as a result of the dynamics of the molding operation. Run 6 above is an example of the defect developing when the "B" dimension is too small.

The mold employed in performing the runs tabulated in Table I had a ram with a wall thickness at its point of contact with the resin of approximately 7/16 inch. This thickness was chosen arbitrarily for a number of practical reasons. For example, the space between the mold chamber 40 and the jacket 33 of the dip pipe must be sufficient to readily admit the resin charge of either pellets or chips and be such that axial flow of the melt along the welding surfaces is minimized during molding. The minimum gap is also determined by the minimum thickness of the ram that can be used without causing excessive pressure on the resin and fault producing flow therein. On the other hand, excessive cavity volume should be avoided to avoid unnecessary waste in connection with the expensive PFA resin component.

Satisfactory welds have been achieved between PFA resin and both types T6C2 and T6L of "Teflon" PTFE resin in addition to the two types of resin identified above.

While molding temperatures between 640° F. and 685° F. have been mentioned in connection with the specific examples herein, it is believed that satisfactory results can be obtained between about 635° F. and about 710° F., the latter temperature representing the highest usable temperature before onset of undue degradation of the resin.

The description above relative to the preparation of the sub-assembly of FIG. 6 assumed a slip fit between the liner 32 and the core 31. However, if desired, the jacket 33 may first be applied snugly to the core 31. The end 35 could then be trimmed to length "B" and the apertures 36, 38, 39, and so forth, punched therein. Next, the liner 32 could be expanded at a lower temperature than the 525° F. temperature mentioned above such that it makes a tight snug fit with the core 31. The liner end 34 is then trimmed to length A.

Having described and presently preferred embodiments of the subject invention, it will be apparent to those skilled in the subject art that various changes in detail may be introduced without departing from the true spirit of the invention as defined in the appended claims.

What is claimed is:

1. A method of forming a fluorocarbon resin structure in which a body of PFA resin is fused to a body of sintered PTFE resin which comprises the steps of confining a quantity of particulate PGA resin in a zone contiguous to said body of sintered PTFE resin, heating said quantity of PFA resin and at least the PTFE resin which is adjacent said zone to a temperature above the gel point of said PTFE resin and above the melting point of said PFA resin to melt said PFA resin, maintaining said elevated temperature while compacting said PFA resin against said PTFE resin under positive pressure just sufficient to urge said PFA resin melt at a very slow rate without fault producing flow therein into intimate surface contact with said PTFE resin until said former wets the surface of said latter over an area to be fused, after establishing said intimate contact, maintaining the conditions static at the fusing interface by increasing the pressure applied to said PFA resin to a predetermined level at a rate which is sufficiently slow so that there is a minimum tendency for said PFA resin to flow along the surface of said mating PTFE resin, and permitting said resins to cool slowly without force cooling toward ambient temperature while maintaining said pressure near said predetermined level where said predetermined level is chosen sufficient to prevent the formation of sinks and voids in said PFA resin while cooling but below the level at which noticeable flow is induced in said PFA resin, and continuing said cooling at least until said PFA has solidified, thereafter completing said cooling and removing said pressure, whereby said PFA resin becomes fused to said body of PTFE resin at the interface therebetween.

2. A method according to claim 1, wherein said temperature above the gel point is between about 635° F. and 710° F.

3. A method according to claim 2, wherein said positive pressure is below about 40 psi.

4. A method according to claim 3, wherein said predetermined level lies within the range of about 59 psi to 150 psi.

5. A method according to claim 4, wherein said predetermined level is above about 130 psi.

6. A method according to claim 1, wherein said positive pressure is below about 340 psi.

7. A method according to claim 6, wherein said predetermined level lies within the range of about 59 psi to 150 psi.

8. A method according to claim 7, wherein said predetermined level is above about 130 psi.

9. A method according to claim 1, wherein said predetermined level lies within the range of about 59 psi to 150 psi.

10. A method according to claim 9, wherein said temperature above the gel point is between about 635° F. and 710° F.

11. A method according to claim 10, wherein said predetermined level is above about 130 psi.

12. A method according to claim 9, wherein said predetermined level is above about 130 psi.

13. A method according to claim 1, wherein said predetermined level is about 130 psi.

14. A method according to claim 13, wherein said temperature above the gel point is between about 635° F. and 710° F.

15. A method according to claim 13, wherein said positive pressure is below about 40 psi.

16. A method according to claim 1, wherein said temperature above the gel point is between about 675° F. and 685° F., said positive pressure is between about 22 psi and 37 psi, and said predetermined level lies within the range of about 131 psi to 48 psi.

* * * * *

UNITED STATES PATENT OFFICE
CERTIFICATE OF CORRECTION

PATENT NO. : 4,073,856
DATED : February 14, 1978
INVENTOR(S) : Edward J. Chu

It is certified that error appears in the above-identified patent and that said Letters Patent are hereby corrected as shown below:

Column 6, line 62, "pressure" should read --pressures--.

Column 9, line 25, "PGA" should read --PFA--. Column 10, line 18, "340" should read --40--; line 36, before "about" should be inserted --above--; line 46, "48" should read --148--.

Signed and Sealed this

Twentieth Day of June 1978

[SEAL]

Attest:

RUTH C. MASON
Attesting Officer

DONALD W. BANNER
Commissioner of Patents and Trademarks